March 8, 1932.  R. E. MANLEY  1,848,961
BALLOON TIRE INSPECTION
Filed Jan. 21, 1928  2 Sheets-Sheet 1
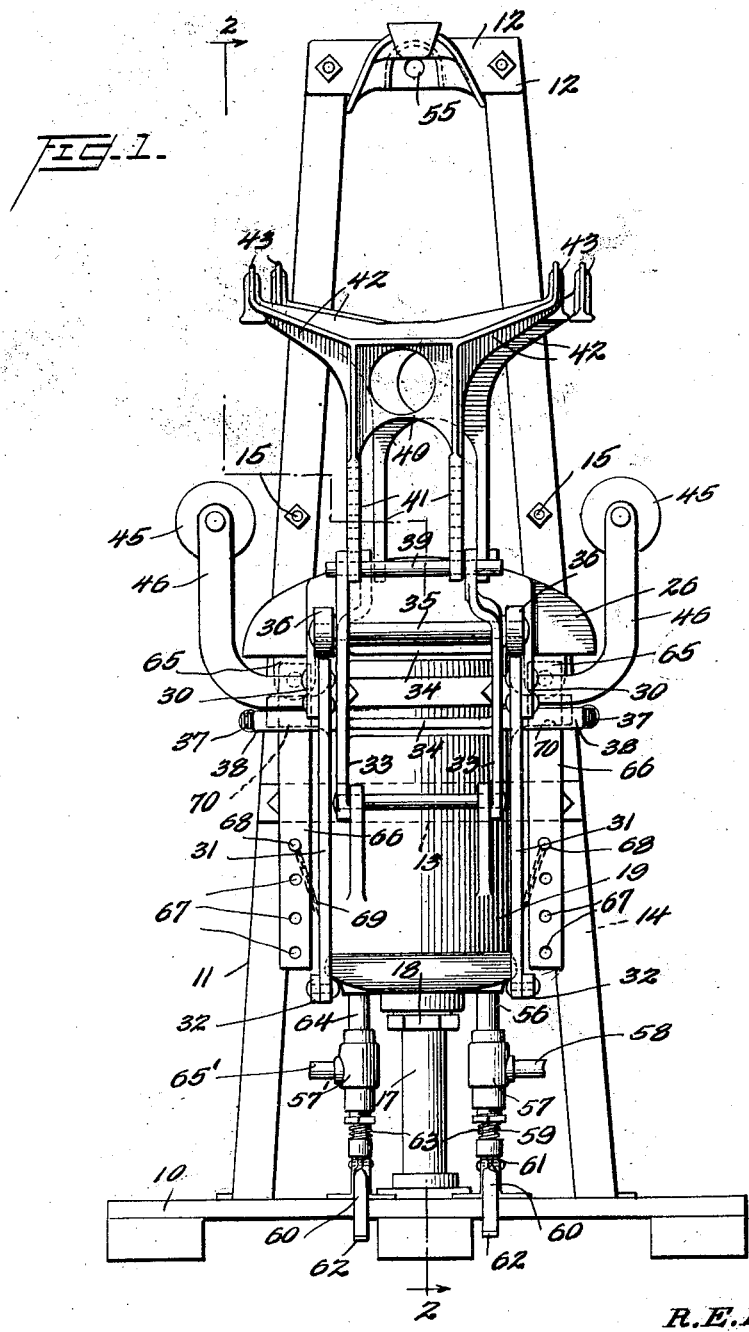
INVENTOR.
R. E. Manley
BY H. H. Snelling
ATTORNEY.

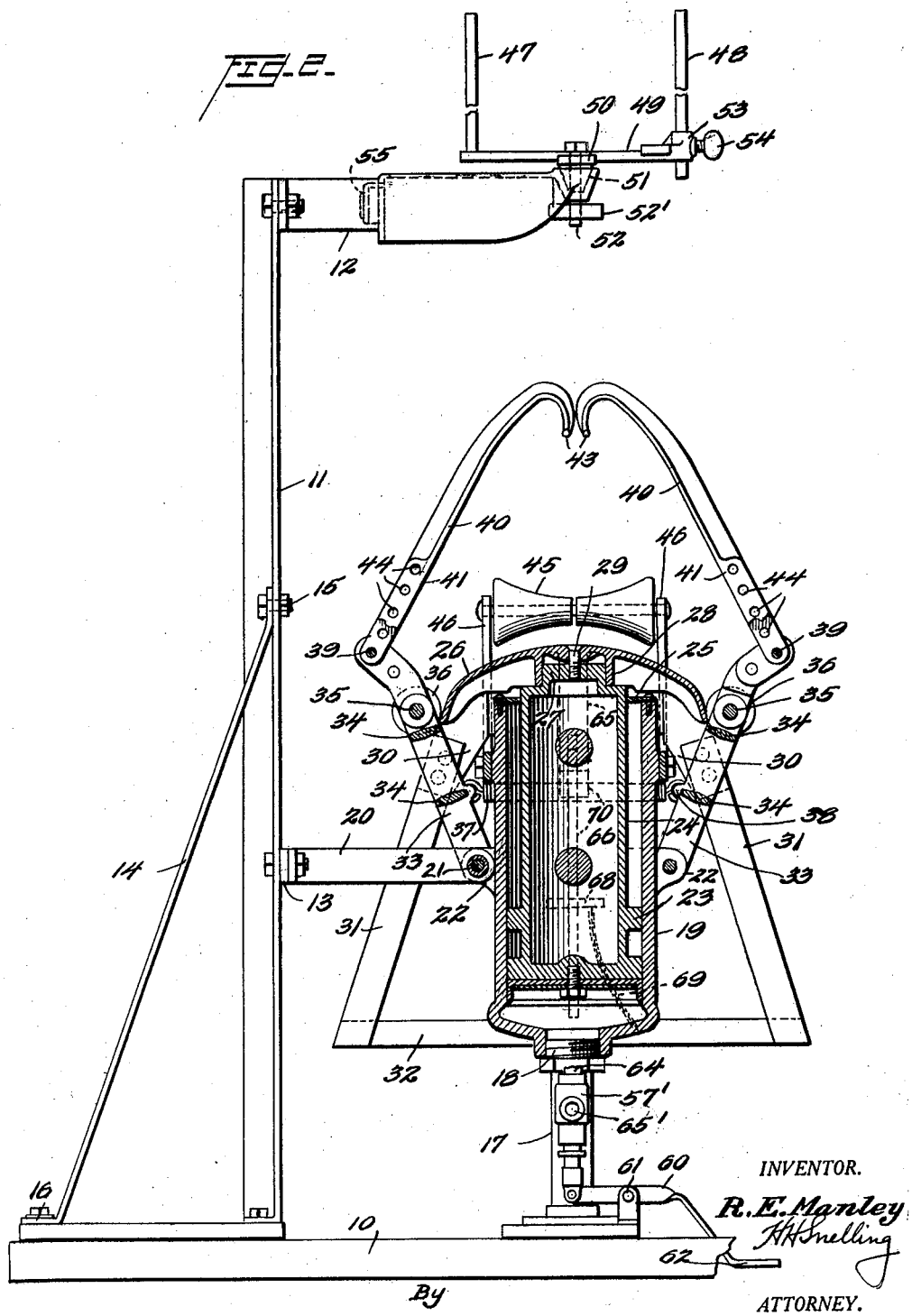

Patented Mar. 8, 1932

1,848,961

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

BALLOON TIRE INSPECTION

Application filed January 21, 1928. Serial No. 248,432.

This invention relates to apparatus for spreading pneumatic tire casings to facilitate the inspection and repair thereof, and has for its principal object the provision of a device of this kind wherein the action of the separating members is smoother than in previous machines and better suited to opening the carcass without danger to the tire fabric, most machines of the prior art tending to stretch the tire rather than gently to unroll it as in the present invention.

A further object of the present invention is to improve generally the control of devices of this nature, by using less air pressure per square inch and by so arranging the valves as to permit the workman to have both hands free when operating the control system in either direction.

A still further object of the invention is to provide a means whereby the workman may position a heavy tire in proper inspection position without the necessity of lifting it over the top of the usual pivoted guiding bracket.

Referring to the accompanying drawings:—

Figure 1 is a front elevation of an apparatus embodying the present invention; and Figure 2 is a vertical sectional view taken on the line 2—2 of Figure 1.

The frame supporting the mechanism comprises a horizontal base 10 formed of any suitable material, from which rise a pair of bars 11 disposed in a transverse vertical plane, inclining laterally towards each other, and connected at their upper ends by a lamp housing 12 and at an intermediate point by a cross bar 13. The bars 11 may be of angle iron, as illustrated, or may have any other suitable form. These bars are securely bolted to the base and are braced by diagonal bars 14 which are bolted thereto at 15 and have foot portions 16 attached to the base. Rising from the base is a cylindrical pedestal 17 located forwardly of the bars 11 and having its axis in the vertical plane passing substantially midway between said bars. The upper end of this pedestal carries a bushing 18 which is screwed into an axial hole in the lower end of a cylinder 19. The cylinder and frame are secured together for mutual support by the brackets 20 connecting cross bar 13 to ears 22 projecting rearwardly from the cylinder.

Operating within the cylinder 19 is a piston 23 formed with a reduced upper extension 24 which, in the lowest position of the piston, projects slightly from the upper end of the cylinder. An annular plate 25 is attached to the upper edge of the cylinder so as to close the space between the cylinder and the piston, for the purpose of preventing dirt, gravel, or other matter from falling into the cylinder.

Secured to the top of the cylindrical extension 24 of the piston is a head 26 having an oblate spherical, or mushroom, form. As shown in the sectional view, Figure 2, the top of the piston extension terminates in a boss 27 and the head 26 is formed with an axial cylindrical portion 28 which projects from the under wall of the head and fits over boss 27 and is secured by a screw 29.

Head 26 is formed with two pairs of downwardly and outwardly extending lugs 30, one pair extending from the front edge of the head and the other pair from the rear edge, and bolted to each of these four lugs is an inclined cam bar 31, which extends downwardly to a point, in down position of the piston, approximately in the horizontal plane passing through the lower end of the cylinder. The outer surfaces of these bars are tangential to the spherical head 26 and abut said head so as to form substantially continuous surfaces therewith. The lower ends of corresponding bars of the two pairs are rigidly connected by horizontal braces 32.

Pivoted on rod 21 in ears 22 is a pair of arms 33 braced by integral cross pieces 34, a similar construction is provided on the front side of the cylinder, the arms of the two pairs being of similar construction and corresponding arms of the pairs being located in the same vertical plane. Transverse shafts 35, are journaled in arms 33, just above the upper cross pieces 34 and carried by the outer ends of these shafts are rollers 36 which bear on the head 26, when the latter is in its lowest position, and which travel on the cam bars 31 when the head rises. The rollers are yieldingly held engaged with the head and cam bars by coiled springs 37, end portions of which are secured to the outer ends of rods 38 which are carried laterally by the arms 33.

The upper portions of arms 33 are bent outwardly and the extremities are formed with apertures through which pass removable rods 39, on which are pivoted grab hooks 40. The two grab hooks are of the same form and construction, each comprising a body portion having depending legs 41 and laterally extending arms 42 terminating in vertical hooks 43. The legs 41 are formed with a number of holes 44 adapted to receive the rods 39, whereby the grab hooks may be pivoted on arms 33 at a plurality of points, affording vertical adjustment of the hooks according to the size of the tire. As shown in Figure 2, the grab hooks are offset laterally with respect to each other for the purpose of preventing interference, this being accomplished by offsetting the end portion of one arm of each pair of arms 33. In the illustration, the terminal portion of the right hand arm of the pair 33 is inwardly offset while the terminal portion of the left hand arm 33 since the castings are identical, is inwardly offset.

The tire to be inspected is adapted to be supported, with its tread either touching or just above the mushroom head 26, by rollers 45 rotatably mounted on axles attached to the upper ends of a pair of U-shaped brackets 46 bolted to the front and rear sides respectively of the cylinder 19 near the upper end thereof. For laterally supporting and guiding the tire there is provided a U-shaped member mounted vertically above the cylinder this member consisting of two round vertical pins 47 and 48 and a horizontal connecting bar 49. Bar 49 is seated in a channel piece 50 which rests on or is secured to a conical washer 51 seated in a conical recess formed in the forward end of housing 12. A bolt 52 passes through registering apertures in the bar 49, the channel piece 50, the conical washer 51 and the housing 12 and its lower end is threaded to receive a clamping nut 52, whereby the U member may be turned and clamped in any desired angular position. The forward pin 48 is slidably mounted in a bracket 53 attached to the forward end of bar 49 and is adapted to be clamped therein by a thumb screw 54. Housing 12 is formed with a horizontal socket 55 for the attachment of an electric light bulb adapted to illuminate the interior of the tire being inspected.

Compressed air is admitted into the bottom of cylinder 19 at one side through a pipe 56 which is secured at its lower end in a valve housing 57 in which is mounted a suitable valve controlling the admission of compressed air through a hose 58 leading to a source of air supply. The stem 59 of this inlet valve projects downwardly from the housing and is pivoted at its lower end to the rear end of a lever 60 which is fulcrumed at 61 and is formed with a foot piece 62 at its forward end. A coiled compression spring 63 acting between the valve stem and the valve housing tends to hold the inlet valve closed. An exhaust pipe 64 communicates with the bottom of the cylinder at the other side and opens at its lower end into a valve housing 57' formed with a port 65' opening to the atmosphere. The outlet valve in this housing is connected to a foot lever 60 by conections similar in all respects to those described with reference to the admission valve.

To adjust the limit of the upward movement of piston 23, the following mechanism is provided: Pivoted in lugs 65 depending from the lower edge 26 at opposite sides of the head are bars 66 each formed with a plurality of equispaced apertures 67 in any one of which a pin 68 is adapted to be inserted. To prevent mislaying the pins they are connected to chains 69 permanently attached to the cylinder 19. The bars 66 pass downwardly through slotted lugs 70 formed integrally with the cylinder and are thus guided for vertical movement. The upward travel of the piston is stopped when the pins 68 engage the lugs 70, and this travel of course is greater or less according to the particular hole in which the pin is inserted.

The drawings show the normal positions of the several parts of the apparatus. When it is desired to use the apparatus for the inspection and repair of a tire, the grab hooks 40 are turned about their pivots 39 until the arms 42 of the rear hook rest against the uprights 11 of the frame and the arms of the front hook rest against the inclined cam bars 31. The pin 48 having been slid down so as to offer no obstruction to the lifting of the tire over cross bar 49, the tire is lifted up on to the rollers 45 and the pin 48 is slid up and clamped in position, the top part of the tire being now positioned in guiding position between the pins 47 and 48. The pins are sufficiently spaced so that when the vertical plane including them is at right angles to the plane of the tire the largest size tire can pass between them. If the tire is smaller the pins are angularly adjusted more or less according to the size, and in all cases are positioned so as to engage the sides of the tire to support and guide it in a vertical plane.

It is to be here noted that by making the forward pin 48 vertically movable so that it can be lowered out of the way of the tire when being placed in the apparatus, the effort necessary to raise the tire over this pin is avoided. Large tires are heavy and cumbersome, and by the provision of this movable pin a very considerable amount of effort and trouble is avoided.

The tire being properly positioned, the hooks 40 are turned inwardly and are adjusted (by passing the pins 39 through the proper holes 44) so as to be adapted to engage the opposite edges, or beads, of the tire in whatever may be the size of the tire. The operator now presses down with his foot on the lever 60 controlling the admission of compressed air into cylinder 19, and the pressure thus produced below the piston 23 causes the latter to rise and with it the head 26 and the cam bars 31. The head 26 rises against the tread of the tire while the action of the cam bars 31 on rollers 36 effects a smooth and uniform downward and outward movement of the grab hooks 40 and a consequent downward and outward pull on opposite portions of the tire bead. The construction is such that the hooks are moved downward and outward in accordance with the natural downward and outward movement of the beads so that no stretching of the material results. The tire being thus subjected to upward pressure on its tread simultaneously with a downward and outward pull on its beads at opposite sides of the point of application of the upward pressure, tends to turn inside out. The tire can thus be spread more or less as desired by adjustment of the piston travel, this being effected by inserting pins 68 in the proper apertures 67 of bars 66. When the inspection, or inspection and repair, has been made at one point, the foot lever 60 controlling the exhaust valve is depressed, thereby placing the cylinder in communication with the atmosphere, whereupon the piston, and with it, the head and cam bars will move back toward normal position under the action of gravity, the resiliency of the spread tire, and the urge of the springs 37. The tire can now be rotated to another position for further inspection, or removed. It is desired to call attention to the fact that in the present apparatus, the operations are controlled solely by the feet, leaving the hands of the operator free to perform whatever manipulations may be required.

What I claim is:

1. An apparatus of the kind described comprising in combination, a cylinder, a piston therein, a head connected to the piston, means for supporting a tire, arms pivoted at their lower ends on spaced axes fixed with respect to the piston, hooks pivoted to said arms adapted to engage opposite beads of the tire, and cam means to move the arms outwardly on their pivots upon the upward movement of the piston.

2. An apparatus of the kind described comprising in combination, a substantially vertical cylinder, a piston therein, a head over the cylinder connected to the piston, downwardly and outwardly extending bars secured to said head at opposite sides thereof, arms pivoted at opposite sides of the cylinder and carrying rollers engaging said bars, and hooks pivoted to said arms adapted to engage the opposite beads of a tire positioned over said head.

3. An apparatus of the kind described comprising in combination, a cylinder, a piston therein, a head over the cylinder connected to the piston, downwardly and outwardly extending bars secured to said head at opposite sides thereof, arms pivoted on the cylinder and carrying rollers to engage said bars and be cammed thereby as the piston moves in one direction, coiled tension springs connecting opposite arms, and hooks pivoted to said arms adapted to engage the opposite beads of a tire positioned over said head.

4. An apparatus of the kind described comprising in combination, a substantially vertical cylinder, a piston therein, a head over the cylinder connected to the piston, means for supporting a tire over said head, hooks mounted at opposite sides of the head adapted to engage the beads of a tire positioned over the head, connections between the piston and hooks adapted to move the hooks downwardly and outwardly as the piston and head move upwardly, a valve controlling the admission of fluid under pressure into the lower end of said cylinder, a valve controlling the exhaust of fluid pressure from said cylinder, and two foot levers respectively connected to said valves.

5. An apparatus of the kind described comprising in combination, a frame including a base, a pedestal attached to the base, a cylinder supported by the pedestal, a valve controlling the admission of compressed air into the lower end of said cylinder, a valve controlling communication of the cylinder with the atmosphere, foot levers operatively connected to said valves, a head over the cylinder rigid with the piston, means for supporting a tire over said head, hooks adapted to engage opposite beads of the tire, and connections between the piston and hooks adapted to move the hooks downwardly and outwardly as the piston and head move upwardly.

6. An apparatus of the kind described comprising in combination, a substantially vertical cylinder, a piston therein, a head over the cylinder attached to the piston, means for supporting a tire vertically over the head, hooks at opposite side of the head adapted to engage the beads of the tire, means for moving the hooks downwardly and outwardly as the head moves upwardly, a bar moving with the piston and head formed with a plurality of apertures, a pin adapted to be inserted in any one of said apertures, and a relatively stationary abutment adapted to be engaged by said pin to limit the upward movement of the head.

7. An apparatus of the kind described comprising in combination, a substantially vertical cylinder, a piston therein, a head over the cylinder attached to the piston, means for supporting a tire vertically over the head, hooks adapted to engage opposite beads of the tire, means for moving the hooks downwardly and outwardly as the head moves upwardly, bars secured to and depending from the head at opposite sides, slotted lugs on the cylinder through which said bars pass, said bars being formed with a plurality of holes, pins adapted to be inserted in said holes so as to engage said lugs to limit the upward movement of the head.

8. An apparatus of the kind described comprising in combination, a cylinder, a piston therein, a head attached to the piston, means for supporting a tire, said means comprising a pair of vertical pins adapted to receive the upper portion of a tire, one of said pins being movable so that it can be lowered out of the way of the tire when the latter is being positioned in the apparatus, hooks adapted to engage opposite beads of the tire, and means for moving the hooks downward and outward as the head rises.

9. In combination, means for supporting a tire at one point, means for guiding a portion of said tire distant from said supported point, said guiding means including a fixed guide and a cooperating adjustable guide slidable toward the center of the supported tire.

10. In combination, a tire supporting head, a pair of pivoted hooks adapted to grip the beads of the tire, and means for moving the hook pivots outwardly and downwardly, said means including two pivoted links, the pivots of which are spaced apart a distance not less than the width of the tread of the tire.

11. In combination, a tire supporting head, a pair of pivoted hooks adapted to grip the beads of the tire, and means for moving the hook pivots outwardly and downwardly and simultaneously raising the head, said means including two pivoted links, the pivots of which are spaced apart a distance not less than the width of the tread of the tire.

In testimony whereof I affix my signature.

ROBERT E. MANLEY.